Patented Oct. 28, 1952

2,615,816

UNITED STATES PATENT OFFICE 2,615,816

GLASS SOLDER

Anne Patricia Dovey, Hampstead, and Maurice Manners and John Henry Partridge, Pinner, England, assignors to General Electric Company, a corporation of New York No Drawing. Application November 10, 1949, Serial No. 126,682. In Great Britain May 5, 1948

7 Claims. (Cl. 106—53)

This invention relates to glass solders, and more particularly to an improved glass composition for use as a glass solder.

It is well known to employ, for joining together two glass members, or for joining glass to metals or other materials such as mica, a glass solder which is in fact a glass molten at temperatures considerably below those at which the glass forming the member or members to be joined will soften. By making it possible to unite glass members at a relatively low temperature, the use of such a glass solder prevents distortion of the glass members due to heating during the joining process. One class of glass solders commonly employed consists of the lead borate glasses, that is glasses consisting substantially of lead oxide and boron oxide, with certain minor additions. Glasses of this type have sufficiently low viscosity to be used for soldering at temperatures of about 500° C. and are also characterized by having a coefficient of thermal expansion of between 8 and $10 \times 10^{-6}$ per degree centigrade.

Glass solders of this type, having a high lead content, for example 75% to 80% lead oxide, are however subject to certain disadvantages, especially if it is required to use them in powder form, for example they are readily blackened by heat. From this point of view a reduction of lead oxide content is desirable. The lead oxide content could be reduced without detrimentally affecting the viscosity of the glass by replacing part of the lead oxide by alkali metal oxide, but this introduces the disadvantage of appreciably increasing the coefficient of thermal expansion of the glass to such an extent as to make such glass solders unsuitable for joining together glasses of normal composition.

It is the principal object of this invention to provide a lead borate glass solder having a reduced lead content and yet having the properties of low viscosity at relatively low temperatures and a coefficient of expansion similar to that characteristic of the higher lead content glasses. Further objects and advantages of the invention will appear from the following description of species thereof.

We have found that a glass composition having the required properties can be obtained by substituting cadmium oxide for a part of the lead oxide content of a lead borate glass.

According to the present invention, therefore, a glass composition for use as a glass solder comprises lead oxide (PbO), cadmium oxide (CdO) and boron oxide ($B_2O_3$), the total content of lead oxide and cadmium oxide being between 65% and 90% by weight of the composition, and the cadmium oxide content being not greater than 35% by weight.

The permissible limits of the combined proportions of lead oxide and cadmium oxide are determined by the limits of softening point and coefficient of thermal expansion within which a composition is suitable for use as a glass solder. Thus, compositions having a total lead oxide-cadmium oxide content appreciably less than 65% soften at a temperature too high to permit them to be useful as glass solders, while in the case of compositions having a lead oxide-cadmium oxide content appreciably greater than 90% the coefficient of thermal expansion would be so high as to render such compositions unsuitable for soldering together glasses of normal composition. The preferred ranges of proportions of the essential constituents of glass solder compositions according to the invention are, by weight, 65% to 45% lead oxide (PbO), 10% to 35% cadmium oxide (CdO), and 25% to 20% boron oxide ($B_2O_3$).

It is desirable, as in known glass solders, to include in the compositions of the invention minor constituents in the form of small quantities of one or more other metallic oxides, in order to improve the resistance of the glass solder to weathering on exposure to the atmosphere. These minor constituents, however, must be such that they do not produce any appreciable increase in the viscosity or coefficient of thermal expansion of the resulting composition. Zinc oxide is an example of an oxide which is suitable for incorporation in the glass solder compositions, and may be substituted, in amounts up to 8% by weight, for a part of the lead oxide.

In addition, small amounts of silica, up to 2% by weight, may be included in the composition to increase further the resistance to weathering.

Some suitable compositions for glass solders according to the invention are given below, by way of example, all proportions being by weight.

Example 1

| | Percent |
|---|---|
| Lead oxide (PbO) | 54 |
| Cadmium oxide (CdO) | 20 |
| Boron oxide ($B_2O_3$) | 24 |
| Zinc oxide (ZnO) | 2 |

A glass solder of this composition has a sufficiently low viscosity to enable it to be used for soldering at a temperature of about 490° C., and its coefficient of thermal expansion is $8.9 \times 10^{-6}$ per degree centigrade.

Example 2

| | Percent |
|---|---|
| Lead oxide (PbO) | 57 |
| Cadmium oxide (CdO) | 16.5 |
| Boron oxide ($B_2O_3$) | 24.5 |
| Zinc oxide (ZnO) | 2 |

The soldering temperature of this composition is 530° C., and its coefficient of thermal expansion is $8.0 \times 10^{-6}$ per degree centigrade.

Example 3

| | Percent |
|---|---|
| Lead oxide (PbO) | 54 |
| Cadmium oxide (CdO) | 20 |
| Boron oxide ($B_2O_3$) | 16 |
| Zinc oxide (ZnO) | 8 |
| Silica ($SiO_2$) | 2 |

This composition has a coefficient of thermal expansion of $9.1 \times 10^{-6}$ per degree centigrade, and can be used for soldering at a temperature of 500° C.

The glass solder compositions described herein may be used for joining together two glass members, or for joining a glass member to a member of metal or other material such as mica.

We have found it advantageous, in order to avoid contamination of the glass solder compositions by the usual crucible material, such as clay or ceramic material, which may increase the minimum temperature required to attain a given fluidity, to use a crucible consisting of or lined with silver or gold for founding the glass or containing the molten glass. Such crucibles are not appreciably corroded when containing the molten glass solder for a considerable length of time and the glass is not contaminated. The crucibles may be used also in producing lead borate glass solder having the composition by weight of PbO 80 parts, $B_2O_3$ 20 parts and ZnO 2.5 parts, for example. A pure silver crucible is preferred and one having a thickness of $\frac{1}{16}$ in., a depth of 8 in. and a diameter of about 8 in. is suitable.

What we claim as new and desire to secure by Letters Patent of the United States is:

1. A glass composition for use as a glass solder containing essentially lead oxide (PbO), cadmium oxide (CdO) and boron oxide ($B_2O_3$) with 0 to 8% zinc oxide (ZnO) substituted for part of the lead oxide and 0 to 2% of silica ($SiO_2$) by weight of the composition, the total content of lead oxide and cadmium oxide being 65% to 90% by weight of the composition, and the cadmium oxide content being 10% to 35% by weight, said glass having a coefficient of thermal expansion of 8 to $10 \times 10^{-6}$.

2. A glass composition according to claim 1 which also contains zinc oxide in an amount not exceeding 8% by weight.

3. A glass composition according to claim 1 which contains also silica in an amount not exceeding 2% by weight.

4. A glass having a coefficient of thermal expansion of $8.9 \times 10^{-6}$ and having the following composition in percentages by weight:

| | Percent |
|---|---|
| Lead oxide (PbO) | 54 |
| Cadmium oxide (CdO) | 20 |
| Boron oxide ($B_2O_3$) | 24 |
| Zinc oxide (ZnO) | 2 |

5. A glass having a coefficient of thermal expansion of $8 \times 10^{-6}$ and having the following composition in percentages by weight:

| | Percent |
|---|---|
| Lead oxide (PbO) | 57 |
| Cadmium oxide (CdO) | 16.5 |
| Boron oxide ($B_2O_3$) | 24.5 |
| Zinc oxide (ZnO) | 2 |

6. A glass having a coefficient of thermal expansion of $9.1 \times 10^{-6}$ and having the following composition in percentages by weight:

| | Percent |
|---|---|
| Lead oxide (PbO) | 54 |
| Cadmium oxide (CdO) | 20 |
| Boron oxide ($B_2O_3$) | 16 |
| Zinc oxide (ZnO) | 8 |
| Silica ($SiO_2$) | 2 |

7. A glass composition containing essentially 65% to 45% of lead oxide, 10% to 35% of cadmium oxide, 25% to 20% of boron oxide, by weight, with 0 to 8% zinc oxide substituted for part of the lead oxide and 0 to 2% of silica by weight of the composition, said glass having a coefficient of thermal expansion of 8 to $10 \times 10^{-6}$.

ANNE PATRICIA DOVEY.
MAURICE MANNERS.
JOHN HENRY PARTRIDGE.

REFERENCES CITED

The following references are of record in the file of this patent:

UNITED STATES PATENTS

| Number | Name | Date |
|---|---|---|
| 1,673,679 | Huber et al. | June 12, 1928 |
| 2,130,215 | Young | Sept. 13, 1938 |
| 2,210,489 | Lemmens et al. | Aug. 6, 1940 |
| 2,231,718 | Hill | Feb. 11, 1941 |
| 2,435,995 | Armistead | Feb. 17, 1948 |